United States Patent [19]
Rosenberg

[11] 3,815,754
[45] June 11, 1974

[54] BOX FILTER

[75] Inventor: David J. Rosenberg, Glen Cove, N.Y.

[73] Assignee: Pall Corporation, Glen Cove, N.Y.

[22] Filed: Sept. 16, 1971

[21] Appl. No.: 181,122

[52] U.S. Cl.............. 210/445, 55/497, 55/514, 210/DIG. 23, 210/451, 210/493
[51] Int. Cl............................................ B01d 27/08
[58] Field of Search ........... 210/447, 507, 508, 493, 210/446, 445, 451, 454, 473, 484, DIG. 23; 55/521, 497, 510, 521, 514, 503, DIG. 31

[56] References Cited
UNITED STATES PATENTS

| 2,914,181 | 11/1959 | Naftulin et al................ | 210/446 |
| 3,002,870 | 10/1961 | Belgarde et al................. | 210/446 |
| 3,243,943 | 4/1966 | Getzin................................ | 55/510 |
| 3,386,585 | 6/1968 | Weyland et al.................. | 210/446 |
| 3,471,019 | 10/1969 | Trason et al.................... | 210/445 X |
| 3,494,466 | 2/1970 | Rose et al......................... | 210/446 |
| 3,556,298 | 1/1971 | Huebner........................... | 210/447 |
| 3,712,033 | 1/1973 | Gronholz......................... | 210/493 X |

Primary Examiner—Theodore A. Granger

[57] ABSTRACT

A disposable box filter is provided comprising a box housing in at least two portions and having a fluid chamber with two fluid ports, and a filter element in sheet form extending across the fluid chamber and held at its sides by the housing across the line of flow between the fluid ports.

16 Claims, 5 Drawing Figures

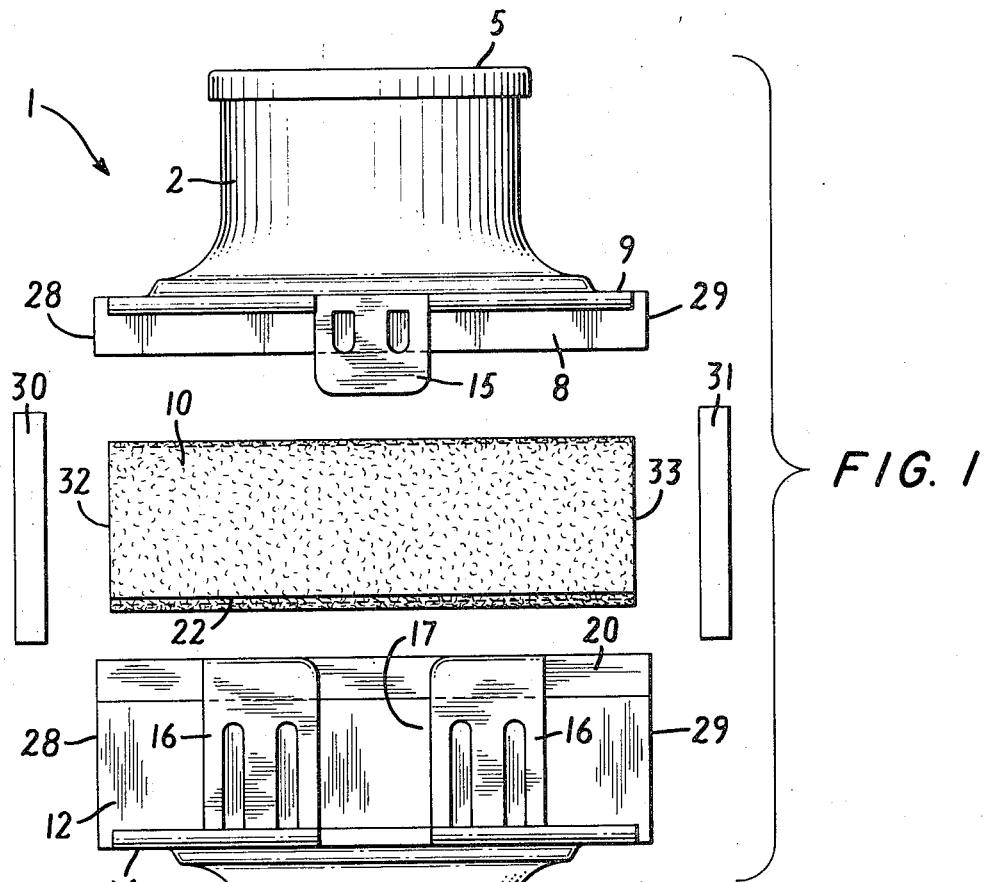
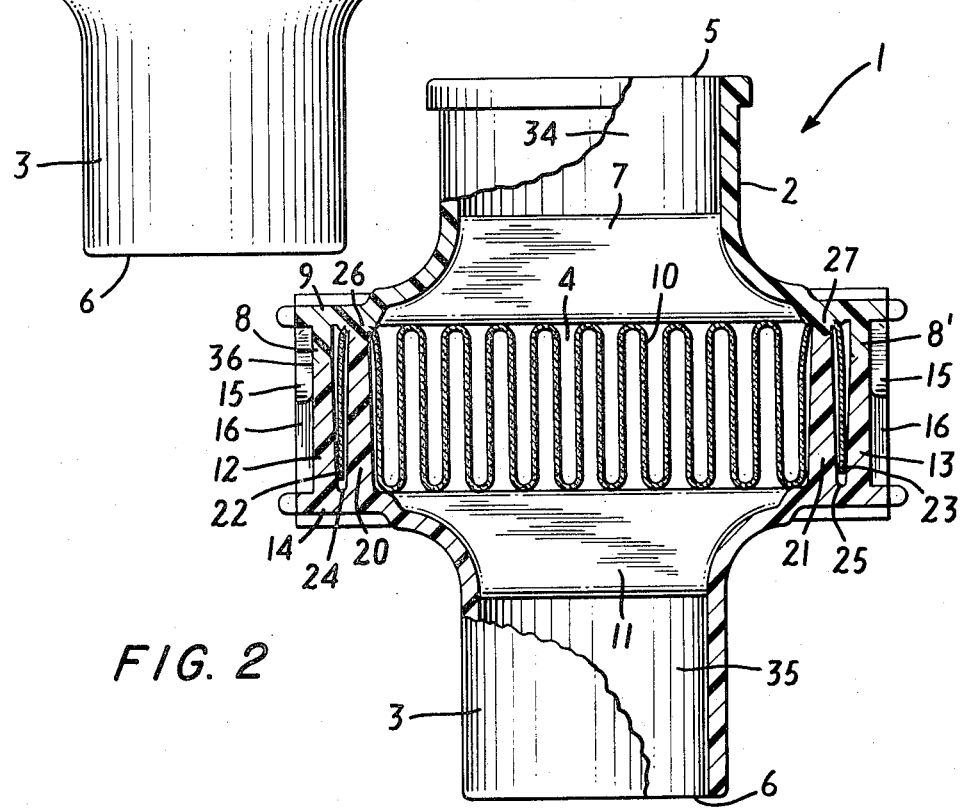

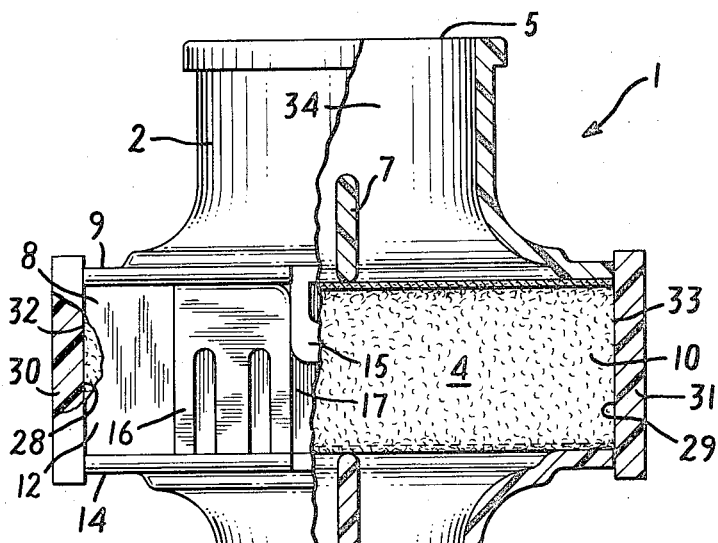
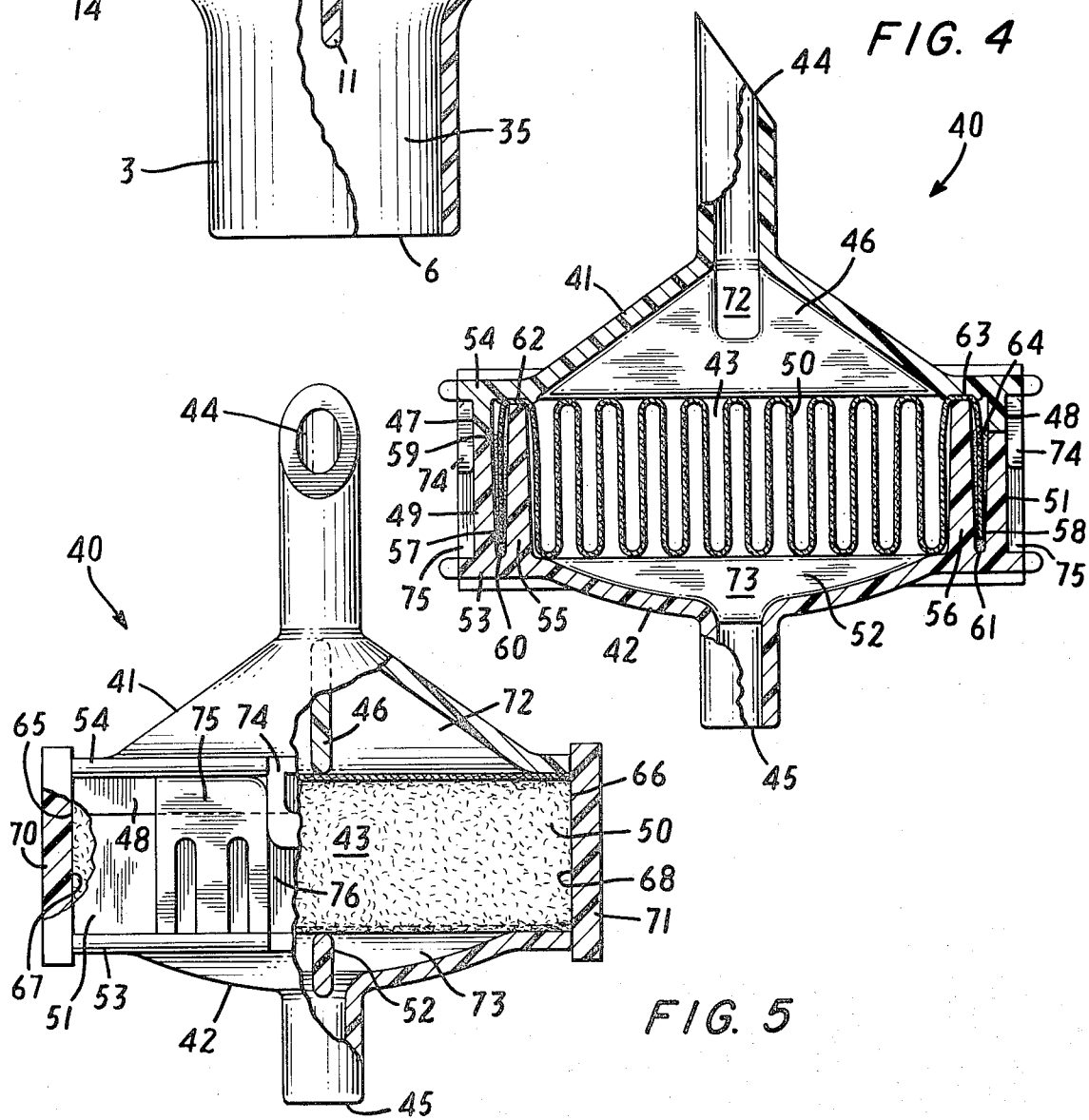

BOX FILTER

It is quite important in medical applications that a filter be capable of being made absolutely sterile before use. To avoid the necessity of complex cleaning and sterilizing operations after use, it is also desirable that the filter be disposable. The design of a filter element that is both sufficiently inexpensive to be disposable, and capable of being autoclaved for a sufficiently long time to render it absolutely sterile throughout, without effect upon the tightness of the fluid seals or distorting the fluid line connections, or changing the pore size of the filter element, is quite a challenge, that is not readily met. The design must, for example, be susceptible of mass quantity production at low cost, and be relatively foolproof from the standpoint of obtaining reliably fluid-tight and microorganism-tight seals. It is particularly important that these requirements be fully met in the case of filters for use in the filtration of blood and to control the administration of fluids or gases to a patient.

Also of considerable importance, although not a matter of necessity, is that the filter element be of a high flow capacity at a low pressure drop in a small compact size. This permits administration or circulation of fluids without excessive line pressures, and avoids the wasting of medical or body fluids in a hold-up in the filter after administration is complete. It also permits use of the filter in a system where only small volumes of fluids or gases are to be administered or serviced.

These requirements make it difficult to fabricate the filter, and particularly the housing, of metal parts, although the use of metallic filter elements is not precluded, partly because the cost of metals is rather high, and partly because they are more difficult and more costly to fabricate, particularly when the filter assembly is to be of a small size. However, when plastic parts are used, it is quite difficult to fabricate the filter in a manner such that the filter element will be securely and reliably sealed in the housing without any possibility of leakage of fluids or microorganisms past the filter, and can be autoclaved in the course of sterilization procedures without developing leaks. Moreover, the sealing of the filter element in the housing presents special problems, due to the difficulty of access to the filter element in the housing while the bonding and sealing operations are carried out.

In consequence, disposable filters have been fabricated of plastic, but the filter elements have been made in a tubular configuration, with the tube ends closed off by end caps, because such a complete filter structure with access past the filter element being blocked by the end caps can be easily sealed in a plastic housing in a leak-tight manner. However, such a structure is relatively costly, because at least two operations, formation of the filter element and sealing the element in a housing, are necessary, and a third operation, fabrication of the housing, and sealing that, may also be required. To enclose the filter directly and inexpensively in a housing in a leak-tight manner has defied design, and such filters if made were not sufficiently inexpensive or reliable to be either disposable or suitable for medical applications.

In accordance with the invention, a disposable filter assembly is provided in a box shape, in which the filter element is in sheet form, is held at its sides in the housing, and can be built into the housing in this way because it is accessible during the bonding operations. This design includes means for closing off the access openings in the housing in a manner to ensure a fluid-tight seal between the housing and all sides of the filter element, so as to preclude any possibility of leakage past the filter element within the housing. The design lends itself to the use of plastic in all parts of the filter assembly, optionally including even the filter element itself, and also makes it possible to integrate the component parts of the disposable filter assembly into as little as one piece. The filter assembly can be made in mass production in large quantities, at low cost, so that the assembly can be considered as truly disposable after one use.

The disposable box filter in accordance with the invention comprises, in combination, a housing having at least two fluid ports and composed of at least first and second generally channel-shaped housing portions defining therebetween a fluid chamber open at two sides, the opposed sides of the first and second channel-shaped housing portions having mating sections abutting and bonded in a fluid-tight seal to each other, a filter element in sheet form extending across the fluid chamber across the line of fluid flow between the fluid ports and held at opposite side portions between the mating sections of the first and second housing portions; and side caps bonded to the first and second housing portions in a fluid-tight seal across the open sides of the fluid chamber, and to the sides of the filter element extending along such open sides, the side caps together with the first and second housing portions holding the sides of the filter element, positioning the filter element across the fluid chamber, and sealing all the sides of the filter element to the housing so that the fluid flow between the fluid ports must pass through the filter element.

In a preferred embodiment, the mating sections of the first and second housing portions engage and grip opposed sides of the filter element, and are integrated through the pores of the filter element in a fluid-tight seal.

In the preferred embodiment, the disposable filter assembly is a box cube, and substantially square-sided. However, any type of box shape can be used.

Since the first and second housing portions are channel-shaped, and are open at their sides between the opposed sides of the channel, during assembly, until the side caps are put on, there is complete access to the interior of the mating sections, to ensure that a fluid-tight seal to the corresponding sides of the filter element is obtained when the mating sections thereof are bonded together. The sides of the filter element extending across the open channel sides are then sealed to side caps, which are bonded to the first and second housing portions across the openings. The sides of the filter element are easily affixed to the caps in a fluid-tight seal by adhesive, or by potting the caps to the filter element. The result is that all sides of the filter element are sealed to the sides of the housing, on one set of opposed sides to the side caps, and on the other opposed sides to the first and second housing portions, so that all fluid flow between the fluid ports must pass through the filter element.

Two preferred embodiments of the invention are shown in the drawings, in which:

FIG. 1 represents an exploded view of a box filter in accordance with the invention showing the component parts prior to assembly, including the two housing portions, the filter element in sheet form, and the two side caps;

FIG. 2 represents a side view, partly in section, of the filter assembly of FIG. 1;

FIG. 3 represents another side view, partly in section, of the filter assembly of FIG. 1, looking towards one of the side caps;

FIG. 4 represents a side view, partly in section, of another embodiment of box filter assembly of the invention.

FIG. 5 represents a side view, partly in section, of the box filter assembly of FIG. 4 looking towards one of the side caps.

The filter assembly of FIGS. 1 to 3 is composed of a housing 1 having first and second housing portions 2 and 3 defining a fluid chamber 4 therewithin. A fluid port 5 is at the base of housing channel portion 2, and a fluid port 6 is at the base of housing portion 3. It will be seen that these ports are coaxial. One port serves as a fluid inlet and the other as a fluid outlet; fluid flow can be from either direction, if the filter element 10 is a corrugated sheet whose opposite sides are the same. Housing portion 2 has an internal projection 7 or rib extending from one side 8 to the other side 8', and housing portion 3 has a like internal projection 11 extending from one side 12 to the other side 13. These serve as supports extending across the corrugations of the square filter sheet 10 serving as the filter element.

Each housing portion 2 and 3 is generally channel-shaped with opposed sides 8 and 8' extending outwardly from the base portion 9, defining the channel of portion 2, and opposed sides 12 and 13 extending outwardly from base portion 14, defining the channel of portion 3. Portion 2 has on each side a pair of locating fingers 15 and portion 3 has on each side two pairs of locating fingers 16 with a slot 17 therebetween into which fingers 15 fit. These locate the portions 2, 3 on assembly. Sides 12, 13 at their ends abut sides 8, 8' and are fused thereto, to hold the housing portions together as one piece. A pair of projecting members 20, 21 on portion 3 extend parallel to and internally of sides 12, 13, all the way to the internal wall of housing portion 2. The filter sheet 10 at each edge 22, 23 projects into the sockets 24, 25 defined by sides 12, 13 and members 20, 21, and where the sheet curves around the tips of members 20, 21 is held tightly at 26, 27 against the internal wall of portion 2, and is bonded thereto. The bond is produced by fused integration of the members 20, 21 to the housing portion 2 through the open pores of the filter element, forming a fluid-tight seal at 26, 27 all along those sides of the filter element. Such a bond can be obtained, for example, by ultrasonic welding, by solvent softening, or by heat-fusion.

The filter element 10 can be of any filter sheet material. The element shown is made of paper having a microporous fibrous layer thereon and bonded thereto, prepared in accordance with U.S. Pat. No. 3,573,158, dated Mar. 30, 1971, to Pall et al., Example 6. However, plastic or wire mesh, such as polyester mesh fabric, or stainless steel wire mesh, or epoxy-impregnated paper, as well as other types of sheet filter elements, can also be used. The filter element is a square sheet, in corrugated form, for an increased surface area in the limited space of fluid chamber 4, and tips of the corrugations abut and are held in place by the projecting sections 7 and 11 of the housing portions 2 and 3. The edges 32, 33 of the sheet run right to the ends of the sides 12 and 13.

The housing channel portions 2 and 3 are open at their sides and, as best seen in FIG. 3, define openings 28, 29 leading into the fluid chamber 4 in the housing 1. The openings are closed off by side caps 30 and 31, which are bonded to the housing portions 2 and 3 and also to the edges 32 and 33 of the filter sheet 10, extending along the openings from end to end between the mating sections 8, 8', 12 and 13 of the housing portions. This closes off the other two side edges of the filter sheet to fluid flow and restricts flow between the two portions 34 and 35 of the fluid chamber 4 in the housing, via the pores of the filter element 10. This, all flow between the fluid ports 5 and 6 of the housing 1 must pass through the filter.

The assembly of the box filter of FIGS. 1 to 3 is as follows. It will be seen on reference to FIG. 1 that the side sections 8, 8', 12, 13 of each housing portion 2, 3 have a special construction which ensures a fluid-tight seal between the housing portions when they are bonded together. The opposed sides 8, 8' of housing portion 2 meet and abut like sides 12, 13 of the other housing portion 3. Portion 2 has one pair on each side of side-locating fingers 15 and portion 3 has two pairs on each side of side-locating fingers 16 receiving fingers 15 therebetween, to ensure that the portions fit snugly together in the correct position to hold the filter sheet 10 in place.

The sides 8, 8', 12, 13 are each slightly longer than their combined length after they are bonded together. When portions 2 and 3 are fitted together, the sides 8, 8' are readily fused to sides 12, 13 respectively, to produce an integral one-piece structure at the seal 36 (FIGS. 2 and 3). Internally of the sides 12, 13 in housing portion 3 are the projecting members 20, 21, which extend all the way to the interior wall at 26, 27 of the housing portion 2.

In assembly, the edges 22, 23 of the corrugated filter element are folded around the projecting members 20, 21 of housing portion 3, into the sockets between sides 12, 13 and the projecting members 20, 21 where they are held securely. Housing portion 2 is then fitted over the portion 3, and pressed down smartly against the filter sheet, pinching the sheet at 26, 27 against the tips of projecting members 20, 21, holding the sheet firmly in place by the tight engagement between the inner wall of the housing portion 2 and the ends of the members 20, 21. The projecting members 20, 21 are then integrated through pores of the filter element 10 at 26, 27 to the wall of the housing portion 2, forming a fluid-tight seal therebetween, and closing off both sides of the filter element to fluid flow. The sides 8 and 8' of housing portion 2 can also be bonded to the sides 12 and 13 of the housing portion 3 by fusion, such as by ultrasonic welding, at the same time, or thereafter, so that the two housing portions 2, 3 are sealed together, preventing fluid leakage to the outside of the filter assembly.

Next, the side caps 30, 31 are bonded across the openings 28, 29 into the housing portions 2 and 3 and to the filter element edges 32, 33, bonding the filter element sides to the side caps, and completing the fixing of the filter element in place in the fluid chamber, as well as the seals between the filter element sheet and the four side walls of the housing. This can be done using, for example, an adhesive or a melt of adhesive or resin, or other potting composition. The filter assembly is now complete, and ready for use.

The filter assembly is operated in-line, as follows. Fluid flow can be in either direction. Fluid enters at port 5, for example, and enters chamber portion 34, then flows through the filter 10 and enters chamber portion 35, whence it emerges from the housing 1 via port 6.

Line connections can be made at ports 5, 6 in any desired manner. For medical use, Luer-loks can be used.

The filter assembly of FIGS. 4 and 5 is composed of a housing 40 having first and second housing portions 41 and 42 defining a fluid chamber 43 therewithin. A fluid port 44 is at the base of housing channel portion 41, and a fluid port 45 is at the base of housing portion 42. It will be seen that these ports are coaxial. One port serves as a fluid inlet and the other as a fluid outlet; fluid flow can be from either direction, if the filter element 50 is a corrugated sheet whose opposite sides are the same. Housing portion 41 has an internal projection 46 or rib extending from one side 47 to the other side 48, and housing portion 42 has a like internal projection 52 extending from one side 49 to the other side 51. These serve as supports extending across the corrugations of the square filter sheet 50 serving as the filter element.

Each housing portion 41 and 42 has a generally channel-shaped central section, with opposed sides 47 and 48 extending outwardly from the base portion 54, and opposed sides 49 and 51 extending outwardly from the base portion 53, defining the channel. Sides 49, 51 at their ends abut sides 47, 48 and are bonded thereto by an adhesive or potting compound 59 to hold the housing portions together, and complete the housing 40 as one piece. A pair of projecting members 55, 56 on portion 42 extend parallel to and internally of sides 49, 51, all the way to housing portion 41. The filter sheet 50 at each end 57, 58 projects into the sockets 60, 61 defined by sides 49, 51 and members 55, 56 and where the sheet curves around the tops of members 55, 56 is pinched tightly at 62, 63 against the internal wall of portion 41, and the sheet is bonded to the portion 41 and members 55, 56 by adhesive extending through the sealing off the open pores of the filter element, sealing it to the housing. The ends 57, 58 of the filter element are sealed in the sockets 60, 61 by potting compound 64, forming a fluid-tight seal there all along those sides of the filter element. Such a bond can be obtained, for example, using a heat-softened thermoplastic resin adhesive, which hardens upon cooling to form the seal, in which the ends 57, 58 are imbedded.

The filter element 50 can be of any filter sheet material. The element shown is made of paper having a microporous fibrous layer thereon and bonded thereto, prepared in accordance with U.S. Pat. No. 3,573,158 dated Mar. 30, 1971 to Pall et al., Example 6. However wire mesh, such as stainless steel wire mesh, or epoxy-impregnated papers, as well as other types of sheet filter elements, can also be used. The filter element is a square sheet, in corrugated form, for an increased surface area in the limited space of fluid chamber 43, and the tips of the corrugations abut and are held in place by the projecting sections 46 and 52 of the housing portions 41 and 42. The side edges 65, 66 of the filter sheet run right to the ends of the sides 49 and 51.

The housing portions 41, 42 are open at their sides, and as best seen in FIG. 5, define openings 67, 68 leading into the fluid chamber 43 in the housing 40. These openings are closed off by side caps 70, 71, which are bonded to the housing portions 41, 42 and also to the side edges 65, 66 of the filter sheet 50, extending along the openings from end to end between the mating sections 47, 48, 49 and 51 of the housing portions. This closes off the other two side edges of the filter sheet to fluid flow and restricts flow between the two portions 72 and 73 of the fluid chamber 43 in the housing, via the pores of the filter element 50. Thus, all flow between the fluid ports 44 and 45 of the housing 40 must pass through the filter.

The assembly of the box filter of FIGS. 4 and 5 is as follows. It will be seen on reference to FIG. 4 that the side sections 47, 48, 49, 51 of each housing portion 41, 42 have a special construction which ensures a fluid-tight seal between the housing portions when they are bonded together. The opposed sides 47, 48 of the housing portion 41 meet and abut like sides 49, 51 of the other housing portion 42. Portion 41 has on each side a pair of fingers 74 and portion 42 has on each side two pairs of fingers 75 receiving fingers 74 in the notch 76 therebetween, to ensure that the portions fit snugly together in the correct position, to hold the filter sheet 50 in place.

In assembly, the edges 57, 58 of the corrugated filter element are folded around the projecting members 55 and 56 of housing portion 42, into the sockets 60, 61 between sides 49, 51 and the projecting members 55, 56. The potting compound 64 is poured into the socket, imbedding the ends of the filter sheet therein, where it is sealed securely. The filter is then bonded by adhesive to the tops of members 55 and 56, and coated with adhesive on top, directly over members 55 and 56. Housing portion 41 is then fitted over the portion 42, and pressed down smartly against the filter sheet and pinching the sheet at 59 and 60 against the projecting fingers 55, 56 holding the sheet firmly in place by the tight engagement between the inner wall of housing portion 41 and the ends of the fingers 55 and 56. The sides 47 and 48 of housing portion 41 are then bonded to the sides 49 and 51 of the housing portion 42 by potting compound or adhesive 59 so that the two housing portions 41, 42 are sealed together, preventing fluid leakage to the outside of the filter assembly.

Next, the side caps 70, 71 are bonded across the openings 67, 68 to the housing portions 41 and 42, and to the side edges 65, 66 bonding the filter element sides to the side caps, and completing the fixing of the filter element in place in the fluid chamber, as well as between the filter element sheet and the four side walls of the housing. This can be done using an adhesive or a melt of adhesive or resin, or other potting composition. The filter assembly is now complete, and ready for use.

The filter assembly is operated in line as follows. Fluid flow can be in either direction. Fluid enters at port 44, for example, and enters chamber portion 72, then flows through the filter 50 and enters chamber portion 73, whence it emerges from the housing 40 via port 45.

Line connections can be made at ports 44, 45 in any desired manner. For medical use, Luer-loks can be used.

The filter housing and side caps can be made of any synthetic plastic material. Thermoplastic or solvent-soluble plastic materials are preferred because of the ease of bonding, but it is also possible to use thermosetting resins in a thermoplastic, fusible, or heat-softenable stage of polymerization, until the bondings have been effected, after which the curing of the resin can be completed to produce a structure which can no longer be separated. Such a structure is autoclavable without danger of destroying the fluid-tight seal between the housing portions and the filter element and the side caps and the filter element. Thermoplastic resins whose softening point is sufficiently high so that they are not softened under sterilizing autoclaving conditions are preferred for medical use. Exemplary of the plastic materials which can be used are polyethylene, polypropylene, polybutylene, polyisobutylene, polyamides, polyvinyl chloride, polyvinylidene chloride, polyacrylonitrile, polyesters, polycarbonates, polymethyl methacrylate, polyallyl, and polyoxymethylene resins. Polytetrafluoroethylene and polytrifluorochloroethylene also can be used.

Any filter element can be used, but it is usually preferred for medical purposes that the pore size of the filter element be less than 50 microns, and preferably less than 0.3 micron where the passage of bacteria through the filter assembly is to be prevented. Filter sheets which are incapable of passing bacteria include membrane filters and the filter sheets described in U.S. Pat. Nos. 3,238,056, dated Mar. 1, 1966, 3,246,767, dated Apr. 19, 1966, 3,353,682, dated Nov. 21, 1967, and 3,573,158 dated Mar. 30, 1971, to Pall et al.

Also useful are metallic filter sheet materials, such as woven or nonwoven wire mesh, for instance, stainless steel screen, and stainless steel wire mats. Metal filter sheets are readily bonded to plastic housing materials in a fluid-tight seal by fusion or potting techniques, or by use of adhesives.

The disposable box filter assemblies of the invention can have any number of sides, conforming to the circumferential configuration of the filter sheet. The filter sheet is preferably square or rectangular, but it can be any straight-sided polygonal shape, including triangular, hexagonal, pentagonal, and octagonal. The housing embodiments shown in the drawings thus are four-sided cubes, four square filter elements, and this is the simplest and the preferred configuration. However, rectangular, pentagonal, hexagonal, heptagonal, and octagonal and higher polygonal box configurations are possible.

The disposable box filter assemblies of the invention have wide medical uses, and can be used, for example, in the filtration of blood, in blood transfusions, and in extracorporeal transfusion operations, where the blood must be circulated through a filter before being returned to the body. The filters can be used in lines administering fluids and gases of all sorts to a patient, such as, for example, as a breathing filter to isolate the patient from an inhalation therapy apparatus and in the filtering of fluids for intravenous administration, as well as any use where a small extended area disposable filter is needed with a substantial filter surface in a small space.

Having regard to the foregoing disclosure, the following is claimed as the inventive and patentable embodiments thereof:

1. A disposable filter assembly comprising, in combination, a housing in a generally box-like configuration having two ends and at least four opposed sides defining therebetween a fluid chamber and at least two fluid ports; having outer side walls along the ends and two opposed sides, and having two sides open, at least two inner side walls spaced from the outer side walls and extending along said opposed sides; and a filter element in sheet form extending across the fluid chamber across a line of fluid flow between the fluid ports and held in a fluid tight seal extending the length of the inner side walls at opposed side portions of the filter element between an edge of the inner side walls and another portion of the housing; and side caps bonded in a fluid-tight seal to the housing, closing the open sides of the housing and the fluid chamber, and bonded in a fluid-tight seal to the sides of the filter element extending along said sides; the side caps, inner side walls and housing portion holding the filter element at opposed side portions, positioning the filter element across the fluid chamber, and sealing all side portions of the filter element within the housing, so that the fluid flow between the fluid ports must pass through the filter element.

2. A disposable filter assembly in accordance with claim 1, wherein the housing is a box having four sides, two of the sides being defined by the side caps, and the filter element is in four-sided sheet form.

3. A disposable filter assembly in accordance with claim 2, wherein the filter element is in corrugated form.

4. A disposable filter assembly in accordance with claim 1, in which the fluid ports are coaxial.

5. A disposable filter assembly in accordance with claim 1, in which the filter element has a pore size of less than 50 microns.

6. A disposable filter assembly in accordance with claim 1, in which the filter element has a pore size of less than 0.3 micron.

7. A disposable filter assembly in accordance with claim 1, in which the housing is of plastic material.

8. A disposable filter assembly in accordance with claim 7, in which the plastic material is a thermoplastic resin.

9. A disposable filter assembly in accordance with claim 8, in which the thermoplastic resin is polypropylene.

10. A disposable filter assembly in accordance with claim 1, in which the housing is formed in two cooperating sections, each section including one end and one fluid port of the housing, and defining a portion of the opposed outer side walls, with the side wall portions terminating in mating edges, the sections being attached together at the mating edges, thereby completing the side walls and forming a one-piece housing.

11. A disposable filter assembly in accordance with claim 10, in which inner side walls are on one housing section, and the filter element is held at opposed side portions between the inner side walls and one end of the other housing section.

12. A disposable filter assembly in accordance with claim 11, in which the filter element is integrated to the housing sections by fusion thereof through the pores of the filter element.

13. A disposable filter assembly in accordance with claim 10, in which the two housing sections and the side caps are integrated together to form an integral one-piece filter assembly.

14. A disposable filter assembly in accordance with claim 10, in which the inner side walls are on one housing section and the other housing section has a projecting portion clamping the other side of the filter element against the edge of the inner side walls.

15. A disposable filter assembly in accordance with claim 14, in which the filter element is integrated to the housing sections by fusion of the projecting portion of one housing section with the inner side walls of the other housing section through the pores of the filter element.

16. A disposable filter assembly in accordance with claim 10, in which at least one housing section comprises a projecting member engaging and supporting one side of the filter element, and extending with the filter element across the chamber from side to the other of the chamber.

* * * * *